(12) United States Patent
Kimura et al.

(10) Patent No.: US 6,850,303 B2
(45) Date of Patent: Feb. 1, 2005

(54) LIQUID CRYSTAL DISPLAY DEVICE HAVING ADDITIONAL STORAGE CAPACITANCE

(75) Inventors: Masanori Kimura, Daito (JP); Katsuhiko Kumagawa, Neyagawa (JP); Tetsuo Fukami, Neyagawa (JP); Hiroyuki Yamakita, Osaka (JP); Satoshi Asada, Kanazawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 38 days.

(21) Appl. No.: 10/148,131

(22) PCT Filed: Sep. 27, 2001

(86) PCT No.: PCT/JP01/08414

§ 371 (c)(1),
(2), (4) Date: May 28, 2002

(87) PCT Pub. No.: WO02/27392

PCT Pub. Date: Apr. 4, 2002

(65) Prior Publication Data

US 2002/0171779 A1 Nov. 21, 2002

(51) Int. Cl.[7] ............................................. G02F 1/1343
(52) U.S. Cl. ..................................... 349/141; 349/39
(58) Field of Search ............................. 349/38, 39, 141

(56) References Cited

U.S. PATENT DOCUMENTS

| | | | |
|---|---|---|---|
| 5,182,661 A | | 1/1993 | Ikeda et al. |
| 5,694,185 A | * | 12/1997 | Oh .............................. 349/46 |
| 5,781,261 A | | 7/1998 | Ohta et al. |
| 5,852,485 A | * | 12/1998 | Shimada et al. ............ 349/141 |
| 6,028,650 A | * | 2/2000 | Kuroha et al. ................ 349/38 |
| 6,208,399 B1 | * | 3/2001 | Ohta et al. ................... 349/139 |
| 6,281,957 B1 | * | 8/2001 | Oh et al. ..................... 349/141 |
| 6,335,770 B1 | * | 1/2002 | Komatsu ...................... 349/38 |

FOREIGN PATENT DOCUMENTS

| | | |
|---|---|---|
| JP | 4-56828 | 2/1992 |
| JP | 5-232509 A | 9/1993 |
| JP | 6-160878 | 6/1994 |
| JP | 10-3092 A | 1/1998 |
| JP | 11-64886 A | 3/1999 |
| JP | 11-119237 A | 4/1999 |
| JP | 2000-155337 A | 6/2000 |

* cited by examiner

Primary Examiner—Toan Ton
Assistant Examiner—Andrew Schechter
(74) Attorney, Agent, or Firm—McDermott, Will & Emery

(57) ABSTRACT

The liquid crystal display device having an array substrate (10) provided with a pixel electrode (3) disposed in a region defined by two adjacent gate wirings (1) and two adjacent source wirings (2), a switching element (5) for switching a voltage applied to the pixel electrode (3) from the source wiring (2) based on a signal volume fed from the gate wiring (1), a common wiring (8) formed between the two adjacent gate wirings (1), a common electrode (4) being electrically connected to the common wiring (8) and generating an electric field between the common electrode (4) and the pixel electrode (3) for driving the liquid crystal, and a storage capacity electrode (20a) electrically connected to the common wiring (8), wherein the common wiring (8) and the storage capacity electrode (20a) are layered so as to hold at least some part of the pixel electrode (3) in between through insulating layers (6a, 6b).

5 Claims, 12 Drawing Sheets

PRIOR ART

LIQUID CRYSTAL DISPLAY DEVICE HAVING ADDITIONAL STORAGE CAPACITANCE

TECHNICAL FIELD

The present invention relates to a liquid crystal display device, specifically a liquid crystal display device of an IPS (In-Plane Switching) style.

BACKGROUND ART

Active matrix type liquid crystal displays employing thin-film transistors (TFTs) are used in various fields as displays for TV sets, camcorders, personal computers, personal word processors and the like because they can be made thin and light and driven with a low voltage. There is a large market for such displays.

In recent years, particularly for use in TV sets and computers, the demand for liquid crystal display devices having a wide viewing angle, usable for wide screens, has increased. In order to meet this demand, Japanese Unexamined Patent Publication No. 1994-160878 proposes, as a method for increasing the viewing angle of liquid crystal display devices, an IPS (In-Plane Switching) method in which the pixel electrode and the opposing electrode for driving the liquid crystal are formed on a single substrate where liquid crystal molecules are actuated by applying a voltage in a lateral direction. This display method is also known as the lateral electric field method or comb-like electrode method, where the liquid crystal molecules are arranged so that the major axes thereof are parallel with respect to the substrate, and therefore the liquid crystal molecules are never oriented perpendicular to the substrate. Thus, the variance in brightness when seen from various directions becomes less and this makes it possible to achieve a wide viewing angle.

A known IPS style liquid crystal display device will be described below with reference to drawings.

FIG. 11 is a plan view illustrating the structure of one pixel of an array substrate of a prior art liquid crystal display device. FIGS. 12(a) and (b) respectively show cross sections taken along lines P–P' and Q–Q' of FIG. 11. In FIG. 11, gate wirings 1 for feeding scanning signals and source wirings 2 for feeding image signals are disposed so as to intersect at approximately right angles. Nearby each intersection of a gate wiring 1 and a source wiring 2, a thin-film transistor (TFT) 5 having semiconductor layers is formed as a switching element. To the source wiring 2, a comb-like pixel electrode 3 is connected via the TFT 5, and a common electrode 4 functioning as a standard potential is arranged so as to mesh with the pixel electrode 3. The common electrode 4 is electrically coupled to a common wiring 8 disposed between the two gate wirings 1 and 1 in a parallel manner.

As shown in FIGS. 11 and 12, the gate wiring 1, the common electrode 4 and the common wiring 8 are formed on an array substrate 10 as a same layer. Upon this layer, the source wiring 2 and the pixel electrode 3 are formed as a same layer through an insulating layer 6a. At the intersection of the common wiring 8 and the pixel electrode 3, with the insulating layer 6a in between, a storage capacity region 109 is formed. The principal components of the wirings and the electrodes mentioned above include aluminum (Al), chromium (Cr), tantalum (Ta), molybdenum (Mo) and like metals.

On the surface of an opposing substrate 14 facing the array substrate 10, a black matrix 12 and a color filter 13 are formed. As shown by dash-dot-dot lines in FIG. 11, the black matrix 12 is arranged so as to cover the TFT 5 and the non-controlled area of the electric field generated between the gate wiring 1 or the source wiring 2 and the pixel electrode 3 or the common electrode 4. The color filter 13 is formed on the aperture of the black matrix 12, and each pixel thereof has a color layer of red, green or blue so that, in the liquid crystal display device as a whole, these three colors are repeated in an array.

Between the array substrate 10 and the opposing substrate 14, liquid crystal (not shown) is sealed in the gap held constant by beads applied on the substrate. Thus a liquid crystal display device can be obtained.

According to such a liquid crystal display device, the variance between the voltage applied to the pixel electrode 3 and that of the common electrode 4, to which standard potential is applied, generates an electric field substantially parallel to the substrate, and the electric field is applied to the liquid crystal disposed between the electrodes. By storing electric charge while the TFT 5 is in an on-status, even when the leakage of electric charge from the pixel electrode 3 occurs, the storage capacity region 109 can supply the voltage for the leaked portion and maintain the signal voltage at a certain level. This enables the liquid crystal to remain actuated.

The pixel electrode 3, the common electrode 4 and the common wiring 8 of the above-described liquid crystal display device are made of opaque metals, preventing light from passing through these areas. If the area where the pixel electrode 3 and the common wiring 8 forming storage capacity region 109 intersect is too small, the storage capacity becomes insufficiently small, resulting in flicker and crosstalk. Therefore, the storage capacity region 109 must have at least a certain minimal size; however, making the storage capacity region 109 larger leads to a wider non-light-transmitting area. Even in the area where light is transmitted, in some locations such as the gap between the source wiring and the gate wiring, and the common electrode and the pixel electrode, etc., it is not possible to control the light transmittance as much as is desired. Therefore, these locations should be covered with the black matrix 12.

Consequently, the known IPS style liquid crystal display device has drawbacks such as a low pixel aperture, i.e., unsatisfactory ratio of the effective display area to the area of pixel, leading to a panel with low luminance.

DISCLOSURE OF THE INVENTION

An object of the invention is to provide a liquid crystal display device for use in an IPS style liquid crystal panel which displays bright, high quality images by enhancing the aperture ratio while maintaining the capacity of the storage capacity region of the pixels.

In order to achieve the above objects, the liquid crystal display device of the invention comprises an array substrate, an opposing substrate facing the array substrate, and liquid crystal held between the array substrate and the opposing substrate. The array substrate is provided with a plurality of gate wirings and a plurality of source wirings intersecting each other, a pixel electrode disposed in a region defined by two adjacent gate wirings and two adjacent source wirings, a switching element for switching a voltage applied to the pixel electrode from the source wiring based on a signal volume fed from the gate wiring, a common wiring formed between the two adjacent gate wirings, a common electrode being electrically connected to the common wiring and generating an electric field between the common electrode and the pixel electrode creating a voltage for driving the liquid crystal, and a storage capacity electrode electrically connected to the common wiring. The common wiring and the storage capacity electrode are layered so as to hold at least some part of the pixel electrode in between through an insulating layer.

In this liquid crystal display device, at the intersection of common wiring, the storage capacity electrode and the pixel electrode, when seen from a planar view, the storage capacity region is formed. This allows the liquid crystal display device to store electric charge not only between the common wiring and the pixel electrode but also between the pixel electrode and the storage capacity electrode, and therefore the capacity per unit area thereof increases compared to that of known ones. Accordingly, even when the area of the storage capacity is made smaller, high quality of the displayed image can be maintained. This makes it possible to enhance the aperture ratio.

The liquid crystal display device can further comprise an additional storage capacity electrode electrically connected to the pixel electrode. In this case, the pixel electrode and the additional storage capacity electrode are layered so as to hold at least some part of the common wiring or the storage capacity electrode in between through the insulating layer. In this arrangement, it is also possible to store electric charge between the common wiring or the storage capacity electrode and the additional storage capacity electrode. Thereby, the capacity per unit area thereof further increases, enhancing the aperture ratio.

In this liquid crystal display device, it is possible to layer the common wiring, the pixel electrode and the storage capacity electrode in this order, form a light shading film made of the same material as the storage capacity electrode on the same layer as the storage capacity electrode, and cover the switching element with the light shading film. This arrangement reliably prevents backlight and outside light from directly striking a switching element, such as a TFT, etc., and thereby current leakage from the switching element can be prevented. This reduces crosstalk and flicker, etc., improving the image quality. It is possible to form the light shading film and the storage capacity electrode at the same time, and therefore an additional process is not needed.

Furthermore, in this liquid crystal display device, it is possible to form the common wiring and the gate wiring on a same layer and the storage capacity electrode and the common electrode on a same layer. According to this arrangement, the gate wiring is formed on a separate layer from that of the storage capacity electrode and the common electrode through an insulating layer. Therefore, there is no risk of the gate wiring causing short-circuit between the common electrode or the pixel electrode, and the ends of the common electrode and the pixel electrode can be extended to the gate wiring. This can widen the region where the drive of liquid crystal is controllable and further improve the aperture ratio.

To achieve the above objects, the liquid crystal display device of the invention comprises an array substrate, an opposing substrate facing the array substrate, and liquid crystal held between the array substrate and the opposing substrate, wherein the array substrate is provided with a plurality of gate wirings and a plurality of source wirings intersecting each other, a pixel electrode disposed in a region defined by two adjacent gate wirings and two adjacent source wirings, a switching element for switching a voltage applied to the pixel electrode from the source wiring based on a signal volume fed from the gate wiring, a common wiring formed between the two adjacent gate wirings, a common electrode being electrically connected to the common wiring and generating an electric field between the common electrode and the pixel electrode creating a voltage for driving the liquid crystal, and a storage capacity electrode electrically connected to the common wiring, the pixel electrode and the storage capacity electrode are layered so as to hold at least some part of the common wiring in between through the insulating layer.

According to this liquid crystal display device, the storage capacity region is formed at the intersection of the pixel electrode, the storage capacity electrode and the common wiring, when seen from a planar view, and electric charge can be stored not only between the common wiring and the pixel electrode but also between the common wiring and the storage capacity electrode, increasing the capacity per unit area of the storage capacity region than that of known ones. Therefore, it is possible to maintain a high level of image quality even when the area of the storage capacity region is made smaller, and this makes it possible to enhance the aperture ratio.

The liquid crystal display device can further comprise an additional storage capacity electrode electrically connected to the common wiring. In this case, the common wiring and the additional storage capacity electrode are layered so as to hold at least some part of the pixel electrode or the storage capacity electrode in between through the insulating layer. In this arrangement, electric charge can also be stored between the pixel electrode or the storage capacity electrode and the additional storage capacity electrode. This further increases the capacity per unit area of the storage capacity region, and enhances the aperture ratio.

To achieve the above objects, a liquid crystal display device comprises an array substrate, an opposing substrate facing the array substrate and liquid crystal held between the array substrate and the opposing substrate, wherein the array substrate is provided with a plurality of gate wirings and a plurality of source wirings intersecting each other, a pixel electrode disposed in a region defined by two adjacent gate wirings and two adjacent source wirings, a switching element for switching a voltage applied to the pixel electrode from the source wiring based on a signal volume fed from the gate wiring, a common wiring formed between the two adjacent gate wirings, and a common electrode being electrically connected to the common wiring and generating an electric field between the common electrode and the pixel electrode creating a voltage for driving the liquid crystal, wherein both the pixel electrode and the common electrode are formed on a separate layer from that of the gate wiring and the ends of the pixel electrode and the common electrode overlap with the gate wiring. For example, in this liquid crystal display device, it is possible to form the gate wiring from a first conductive layer and form the pixel electrode and the common electrode from a second conductive layer.

This arrangement is free from light leakage from the gap between the pixel electrode or the common electrode and the gate wiring, as the ends of the pixel electrode and the common electrode overlap with the gate wiring. Therefore, formation of a black matrix becomes unnecessary on the area corresponding to this overlap in the opposing layer, enhancing the aperture ratio. It is preferable that the length of the area where the pixel electrode and the common electrode overlap with the gate wiring be 1 to 5 $\mu$m along the longitudinal direction of the pixel electrode or the common electrode.

It is also preferable that the common electrode be formed on a separate layer from that of the source wiring through the insulating layer, and at least some part thereof overlap with the source wiring in the longitudinal direction. This prevents light leakage from the gap between the source wiring and the common electrode, and therefore the area of the opposing substrate where formation of a black matrix is needed becomes smaller, enhancing the aperture ratio.

Alternatively, the pixel electrode and the common electrode can be formed on different layers through the insulating layer for reliably preventing short-circuit between the two. For example, it is possible to form the gate wiring from a conductive layer, form the pixel electrode from a second conductive layer, form the common electrode from a third conductive layer, and insulate each interlayer between the first to third conductive layers by a first and a second insulating layer.

It is also preferable that the gate wiring, the pixel electrode and the common electrode be layered in this order, and a light shading film made of the same material as the common electrode be formed on the same layer as the common electrode for covering the switching element. This allows simultaneous formation of the light shading film and the common electrode, improving image quality without adding any manufacturing steps. The aperture ratio can further be enhanced because formation of a black matrix is not needed in the area corresponding to the switching element on the opposing substrate. Alternatively, it can be so structured that no black matrix formation is conducted on the opposing substrate, simplifying the manufacturing process. It is preferable that the switching element be formed on the gate wiring in order to prevent light leakage from around the switching element.

When the gate wiring, the pixel electrode and the common electrode are layered in this order, it is preferable that an insulating layer formed between the pixel electrode and the common electrode have a thickness of 0.5 $\mu$m or greater and it is also preferable that the insulating layer be made of an organic film. This satisfactorily reduces the parasitic capacity generated in the area where the gate wiring and the common electrode overlap one another and further improves image quality.

In each of the liquid crystal display devices described above, the pixel electrode and/or the common electrode can be made of transparent electrode materials, and thereby the aperture ratio can be enhanced. It is also possible to form the storage capacity electrode so that from one end, where the signal from the gate wiring is fed in, to the other end the electrode becomes smaller. This prevents flicker. BRIEF DESCRIPTION OF THE DRAWINGS FIG. 1(*a*) is a plan view illustrating a structure of one pixel of an array substrate of a liquid crystal display according to a first embodiment of the invention, and FIG. 1(*b*) is a cross-sectional view taken along line A–A' of FIG. 1(*a*).

FIG. 12(*b*) is a cross-sectional view taken along line Q–Q' of FIG. 11.

BEST MODE FOR CARRYING OUT THE INVENTION

Embodiments of the present invention will be described below with reference to the accompanying drawings. It is to be noted that, in the following descriptions, those elements which are identical to the elements of the known liquid crystal display described above are identified with the same reference symbols, and repetitious explanation will be omitted.

First Embodiment

Figure 1:
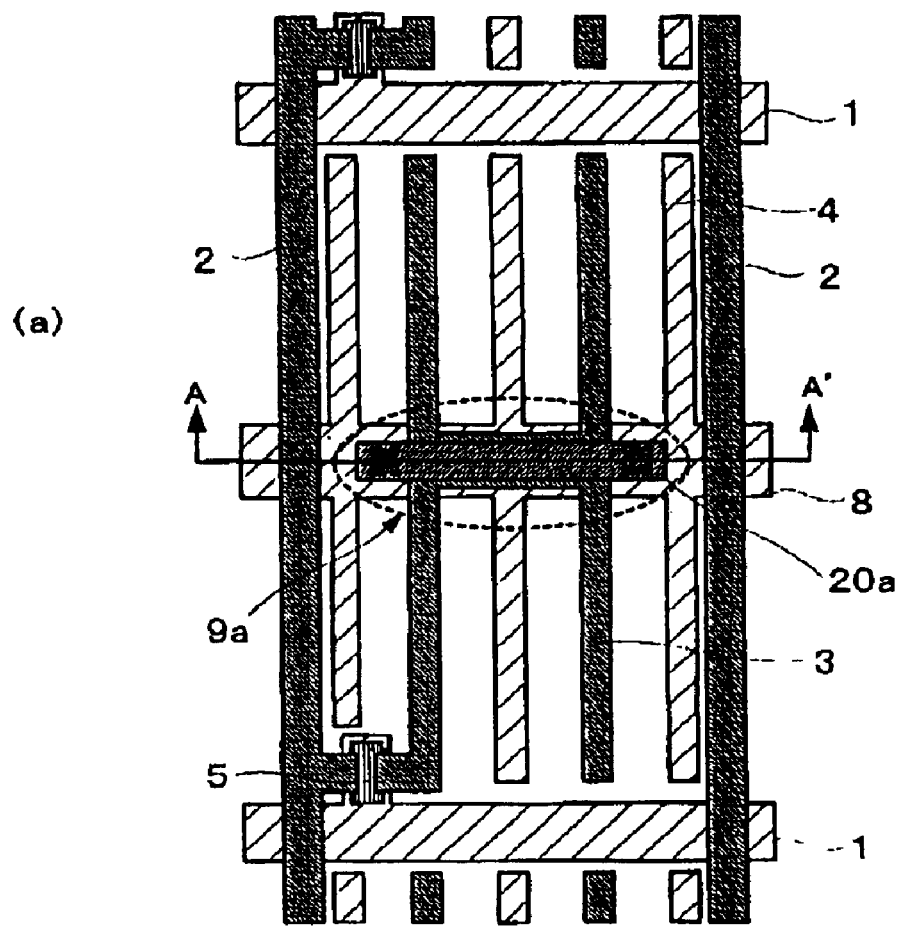
Figure 1:
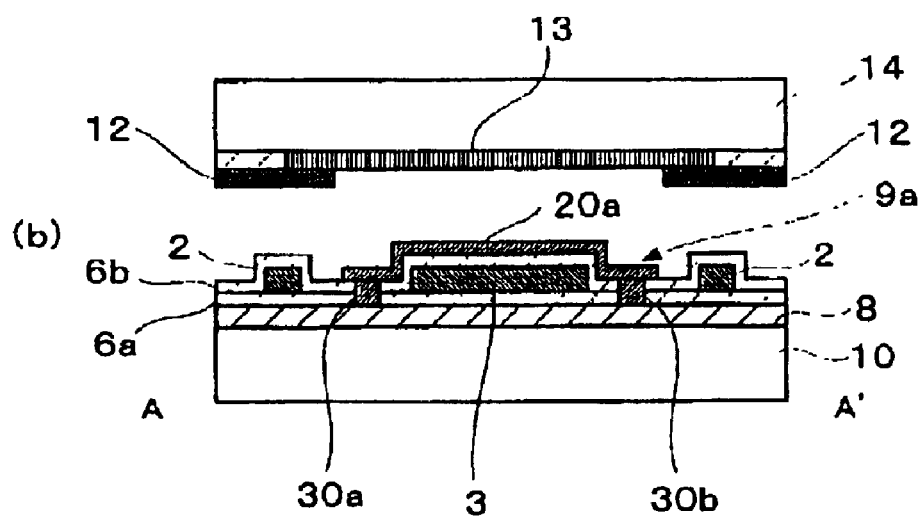

FIG. 1(*a*) is a plan view illustrating a structure of one pixel of an array substrate of a liquid crystal display according to a first embodiment of the invention, and FIG. 1(*b*) is a cross-sectional view taken along line A–A' of FIG. 1(*a*).

Similar to the prior art liquid crystal display device described above, in the liquid crystal display device according to the present embodiment, a storage capacity region 9*a* is formed in the area where a common wiring 8 and a pixel electrode 3 intersect each other through an insulating layer 6*a*. The liquid crystal display device of the present embodiment is different from known ones in that a storage capacity electrode 20*a* is formed upon the pixel electrode 3 in the storage capacity region 9*a*.

In other words, an insulating layer 6*b* is formed on top of a source wiring 2 and the pixel electrode 3, which are formed as a same layer on top of the insulating layer 6*a*. On top of the insulating layer 6*b*, the storage capacity electrode 20*a* is formed so as to be electrically connected to the common wiring 8 via contact holes 30*a* and 30*b* created in the insulating layers 6*a* and 6*b*. The storage capacity region 9*a* is formed in a manner such that the storage capacity electrode 20*a* and the common wiring 8 hold some part of the pixel electrode 3 in between through the insulating layers 6*a* and 6*b*.

The liquid crystal display device according to the present embodiment can be manufactured by the following steps. On a glass plate which will serve as an array substrate 10, a first conductive layer having a principal component such as aluminum (Al) is deposited by spattering or the like. Then, the plate is patterned into a complanate form by photolithography, thus obtaining the gate wiring 1, the common electrode 4 and the common wiring 8.

A first insulating layer 6a made of silicon nitride (SiNx), etc. is deposited by the CVD method or the like. After forming a semiconductor layer made of a-Si, etc. by the CVD method, photolithography or the like, a second conductive layer is subjected to patterning in the same manner as the first conductive layer, obtaining the source wiring 2, the pixel electrode 3 and a TFT 5 serving as a switching element. The widths of the pixel electrode 3 and the common electrode 4 are, for example, 3 to 8 μm and the gap between the two is, for example, 10 to 15 μm.

After forming a second insulating layer 6b in the same manner as the first insulating layer 6a, the contact holes 30a and 30b are formed in the first insulating layer 6a and the second insulating layer 6b by photolithography.

Thereafter, the storage capacity electrode 20a is obtained by forming a third conductive layer followed by patterning in the same manner as the first conductive layer, and then is electrically connected to the common wiring 8 via the contact holes 30a and 30b. On the top surface of the thus obtained array substrate, a fourth insulating layer can be formed for protecting the TFT and the electrode.

There is no limitation to the materials to be used for the foregoing first to third conductive layers; however, preferable are metal materials having a low wiring resistance such as aluminum (Al) and like metals, etc. Furthermore, each conductive layer can be a monolayer film or a multiplayer film.

On the other hand, on a glass substrate serving as an opposing substrate 14, film formation is conducted by spattering or the like using chromium (Cr) metal and pattern formation is achieved by photolithography for obtaining a conductive black matrix 12. Then, resins each having one of the RGB elements (the three colors) are patterned into the area forming the pixels in order, thus obtaining color filters 13 arranged in a dot pattern. In order to prevent contamination of the liquid crystal layer caused by Cr etc., an overcoat layer can be formed over the entire surface of color opposing substrate by using acrylic or like resins. It is also possible to form the black matrix using a resin material. In this case, film formation can be conducted by applying resin by spin coating, printing or a like method, and therefore the manufacturing costs can be reduced.

After applying oriented films (not shown) to the facing surfaces of the thus obtained substrates 10 and 14, rubbing is conducted in a prescribed direction. Thereafter, the substrates are bonded together on the edges by a sealer with a resin spacer held in between. Then, liquid crystal (not shown) is sealed therein, obtaining a liquid crystal display device.

In the peripheral part of the liquid crystal display device, a gate driving circuit is connected to the end of the gate wiring 1 and a source signal driving circuit is connected to the end of the source wiring 2. Thereby, each of the driving circuits makes the liquid crystal display device operate in accordance with the signals input from a controller. Operation of the liquid crystal display device will be explained below.

Firstly, scanning signals and image signals fed from the external circuits are input into the individual gate wirings 1 and the individual source wirings 2, respectively. By the scanning signals fed through the gate wiring 1, the TFT 5 connected to the gate wiring 1 is selectively turned on or off. Thereby, the image signals fed therein via the source wiring 2 while the TFT 5 is in an on-status are fed to the pixel electrode 3. An electric field is generated by the potential difference between the pixel electrode 3 and the common electrode 4, and thereby performance of the liquid crystal oriented between the electrodes is controlled. On the array substrate side of the liquid crystal panel, a backlighting (not shown) comprising a cold-cathode tube is disposed, and the assignment of intensity levels is achieved by controlling the drive of the liquid crystal.

When the TFT 5 is in an off-status, feed of picture-signal voltage into the pixel electrode 3 is stopped; however, the liquid crystal is kept in operation using the electric charge stored in the storage capacity region 9a. The storage capacity region 9a of the present embodiment can store electric charge by generating potential differences between the common wiring 8 and the pixel electrode 3 and between the pixel electrode 3 and the storage capacity electrode 20a, and therefore the capacity per unit area becomes larger than that of the storage capacity region 109 of the known liquid crystal display device described above. This allows the area of overlap of the electrodes to be cut approximately in half. As a result, the aperture ratio of the pixel is enhanced and a high display luminance can be obtained.

(Second Embodiment)

Figure 2:
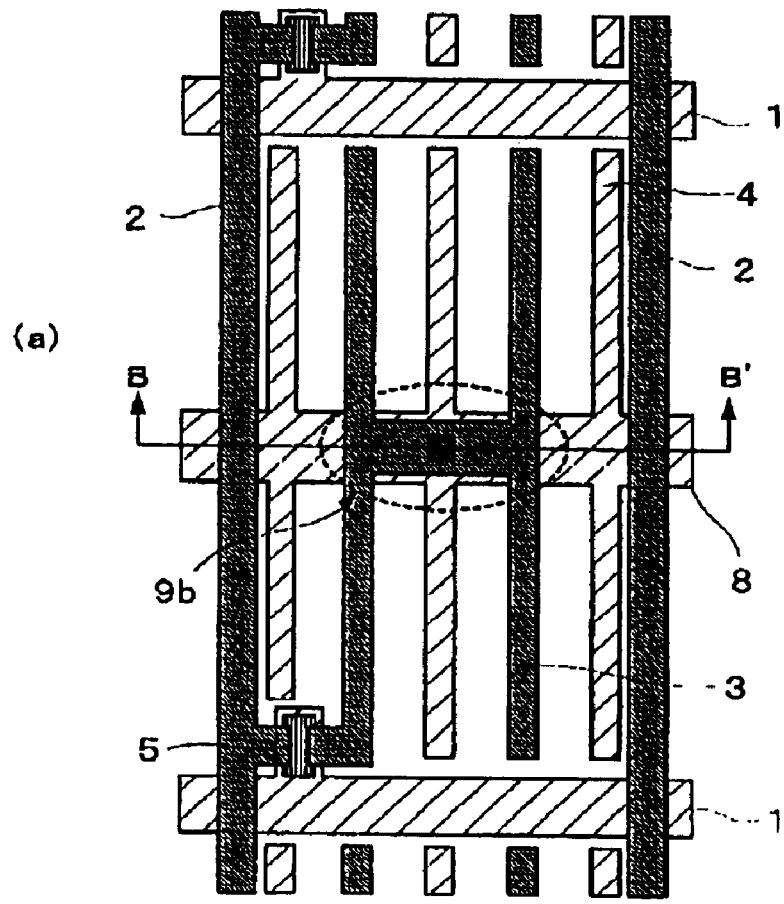
FIG. 2(*a*) is a plan view illustrating a structure of one pixel of an array substrate of a liquid crystal display according to a second embodiment of the invention, and FIG. 2(*b*) is a cross-sectional view taken along line B–B' of FIG. 2(*a*).
Figure 2:
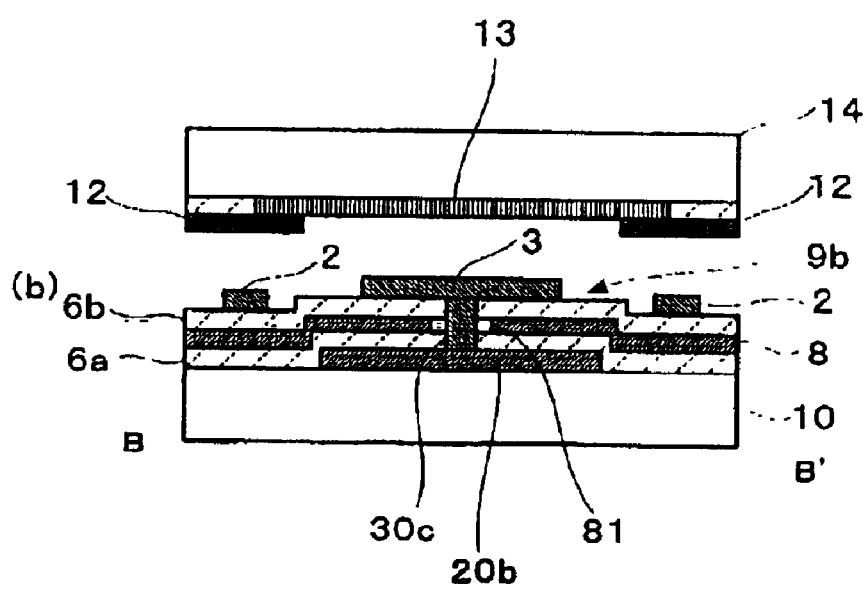

FIG. 2(*a*) is a plan view illustrating a structure of one pixel of an array substrate of a liquid crystal display according to a second embodiment of the invention, and FIG. 2(*b*) is a cross-sectional view taken along line B–B' of FIG. 2(*a*).

The liquid crystal display device of the second embodiment has the same structure as that of the first embodiment in that a storage capacity region is composed of a common wiring, a pixel electrode and a storage capacity electrode, and differs from the first embodiment in that the storage capacity electrode is electrically connected to the pixel electrode.

Precisely, a storage capacity electrode 20b is formed on an array substrate 10 and a gate wiring 1, a common electrode 4 and a common wiring 8 are formed thereon via an insulating layer 6a. On top thereof, a source wiring 2, a pixel electrode 3 and a TFT 5 are formed having an insulating layer 6b thereunder. In some part of the common wiring 8, an aperture 81 is formed. The storage capacity electrode 20b and the pixel electrode 3 are electrically connected via a contact hole 30c formed in the insulating layers 6a and 6b so as to pass through the substantial center of the aperture 81. A storage capacity region 9b is formed in a manner such that the storage capacity electrode 20b and the pixel electrode 3 hold a part of the common wiring 8 in between through the insulating layers 6a and 6b.

By using the storage capacity region 9b of the present embodiment, electric charge can be stored by generating potential differences both between the storage capacity electrode 20b and the common wiring 8 and between the common wiring 8 and the pixel electrode 3. Therefore, the capacity per unit area thereof is larger than that of the storage capacity region 109 of the prior art liquid crystal display device described above. This allows the area of overlap of the electrodes to be cut approximately in half. As a result, the aperture ratio of the pixel is enhanced and a high display luminance can be obtained.

(Third Embodiment)

Figure 3:
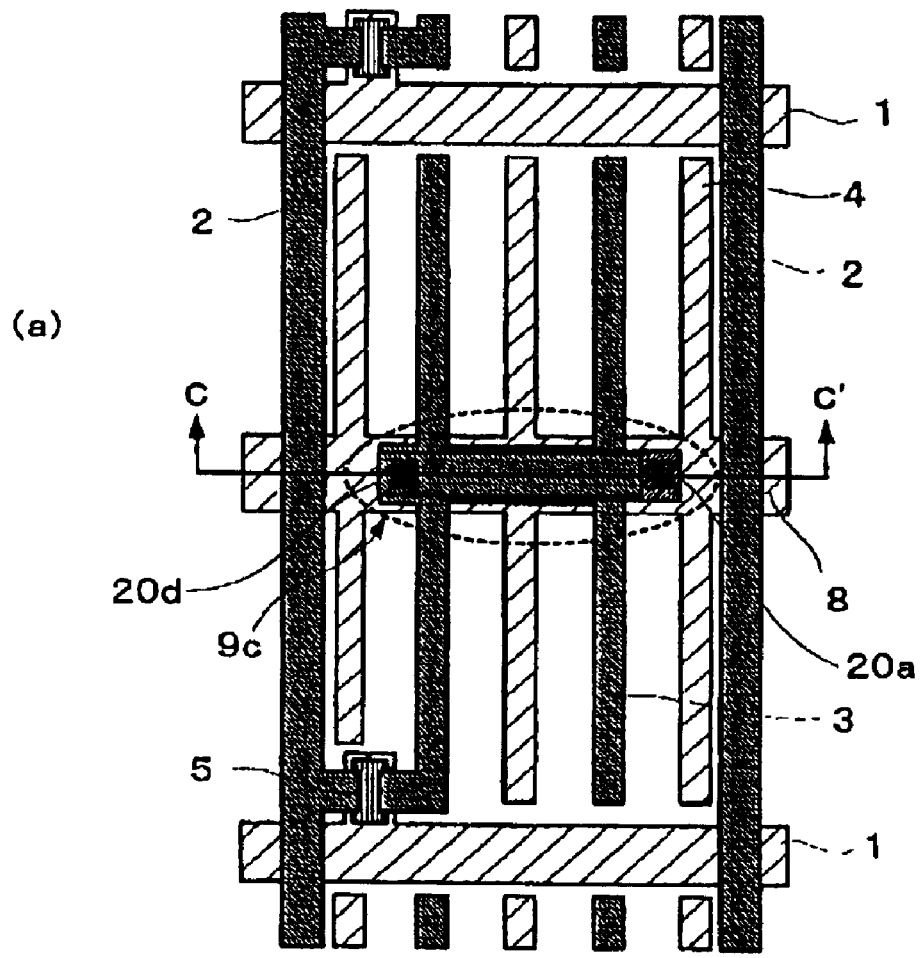
FIG. 3(*a*) is a plan view illustrating a structure of one pixel of an array substrate of a liquid crystal display according to a third embodiment of the invention, and FIG. 3(*b*) is a cross-sectional view taken along line C–C' of FIG. 3(*a*).
Figure 3:
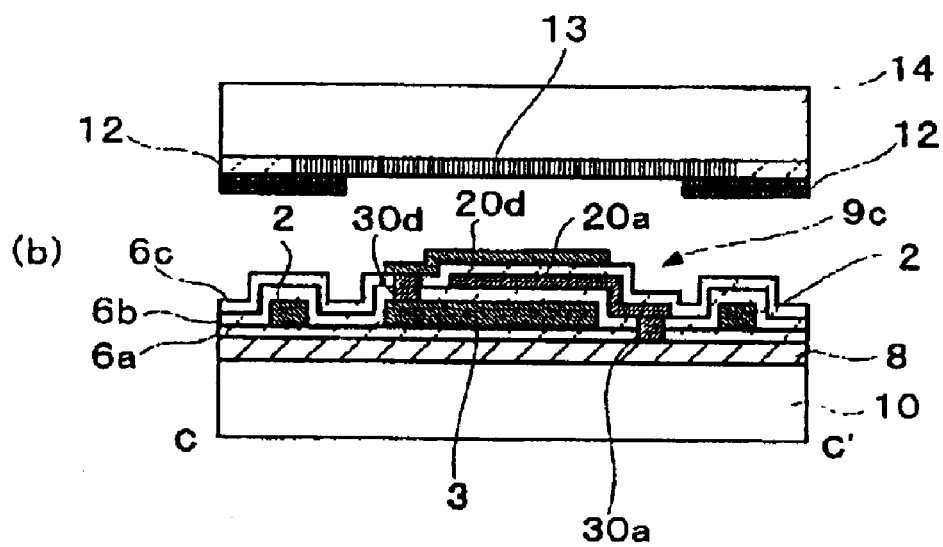

FIG. 3(*a*) is a plan view illustrating a structure of one pixel of an array substrate of a liquid crystal display according to a third embodiment of the invention, and FIG. 3(b) is a cross-sectional view taken along line C–C' of FIG. 3(a).

The liquid crystal display device of the third embodiment is the same as the liquid crystal display device of the first embodiment in all respects except that it further comprises an additional storage capacity electrode.

Precisely, an insulating layer 6c is formed on a storage capacity electrode 20a and, on the insulating layer 6c, an additional storage capacity electrode 20d is formed. The additional storage capacity electrode 20d is electrically connected to a pixel electrode 3 through a contact hole 30d located on the insulating layers 6b and 6c. Thereby, a storage capacity region 9c is formed at the intersection of common wiring 8, the pixel electrode 3, the storage capacity electrode 20a and the additional storage capacity electrode 20d, when seen from a planar view.

In the storage capacity region 9c of the present embodiment, potential differences are individually generated between the common wiring 8 and the pixel electrode 3, between the pixel electrode 3 and the storage capacity electrode 20a and between the storage capacity electrode 20a and the additional storage capacity electrode 20d, allowing storage of electric charge. Therefore, the capacity per unit area thereof further increases compared to the storage capacity regions of the first and second embodiments. As a result, the aperture ratio of the pixel is enhanced and a high display luminance can be obtained.

In the liquid crystal display device of the present embodiment, on top of the additional storage capacity electrode 20d, another storage capacity electrode can be deposited. In other words, by layering electrodes so as to overlap each other with holding an insulating layer in between in a manner such that a first storage capacity electrode is electrically connected to the common wiring 8 and a second storage capacity electrode is electrically connected to the pixel electrode 3, the capacity per unit area of the storage capacity region is further enhanced.

The liquid crystal display device of the second embodiment can also be provided with an additional storage capacity electrode on the pixel electrode thereof through the insulating layer. By electrically connecting the additional storage capacity electrode to the common wiring 8 via a contact hole, an effect similar to that of present embodiment can be achieved.

(Fourth Embodiment)

Figure 4:
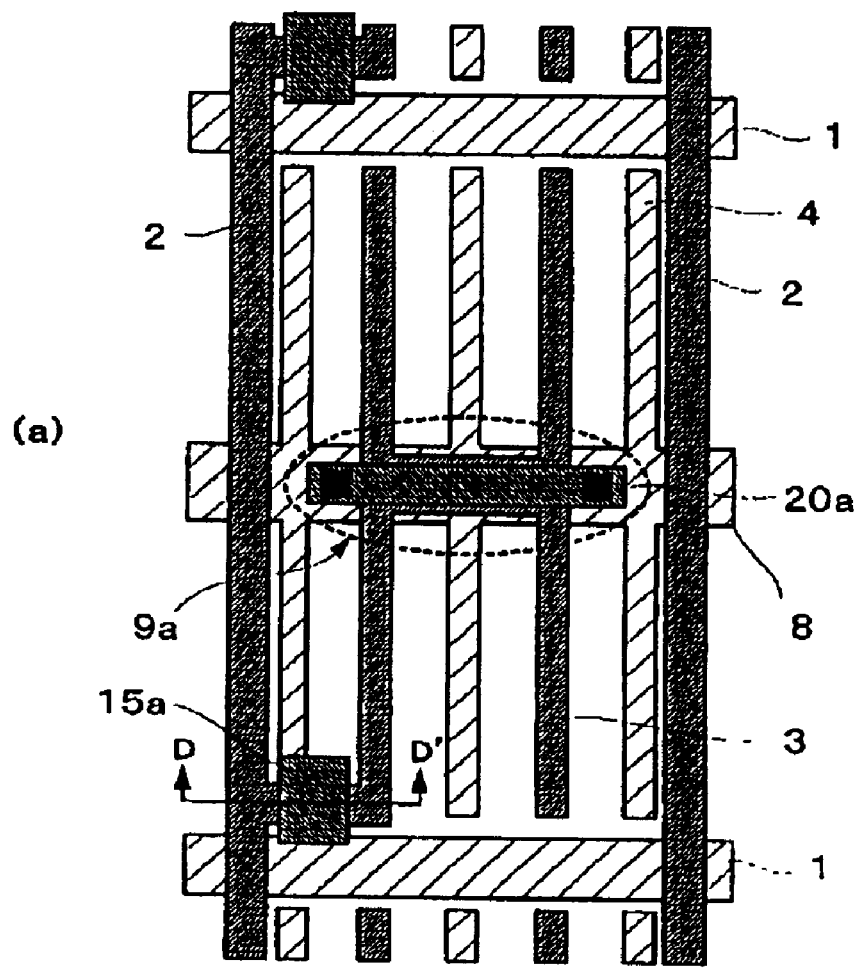
FIG. 4(*a*) is a plan view illustrating a structure of one pixel of an array substrate of a liquid crystal display according to a fourth embodiment of the invention, and FIG. 4(*b*) is a cross-sectional view taken along line D–D' of FIG. 4(*a*).
Figure 4:
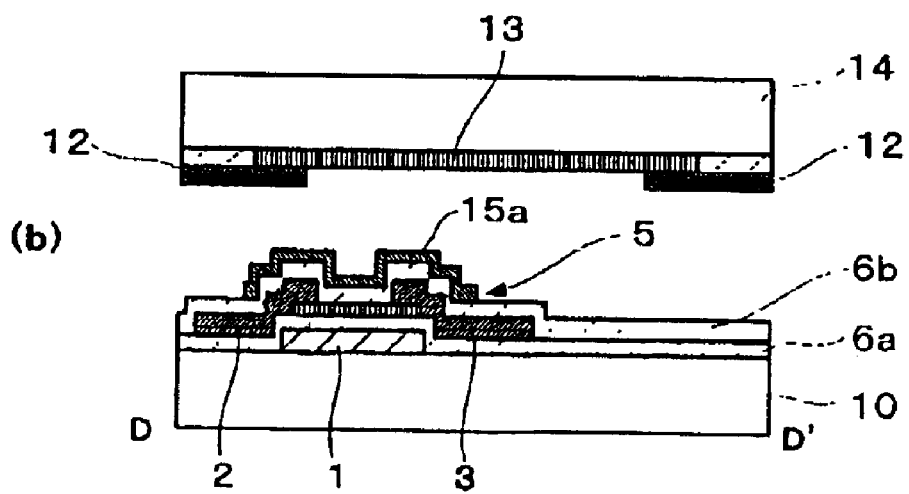

FIG. 4(a) is a plan view illustrating a structure of one pixel of an array substrate of a liquid crystal display according to a fourth embodiment of the invention, and FIG. 4(b) is a cross-sectional view taken along line D–D' of FIG. 4(a).

The liquid crystal display device according to the fourth embodiment comprises a light shading film 15a made of the same material as the storage capacity electrode 20a which is formed on the same layer as a storage capacity electrode 20a. In other respects, the construction thereof is the same as that of the first embodiment.

This arrangement allows simultaneous formation of the light shading film 15a and the storage capacity electrode 20a, and therefore additional steps for obtaining the light shading film 15a are unnecessary. By covering the top of the TFT 5 with the light shading film 15a, deterioration of image quality attributable to backlight or outside light, which is inherent in the TFTs, can be prevented.

Figure 5:
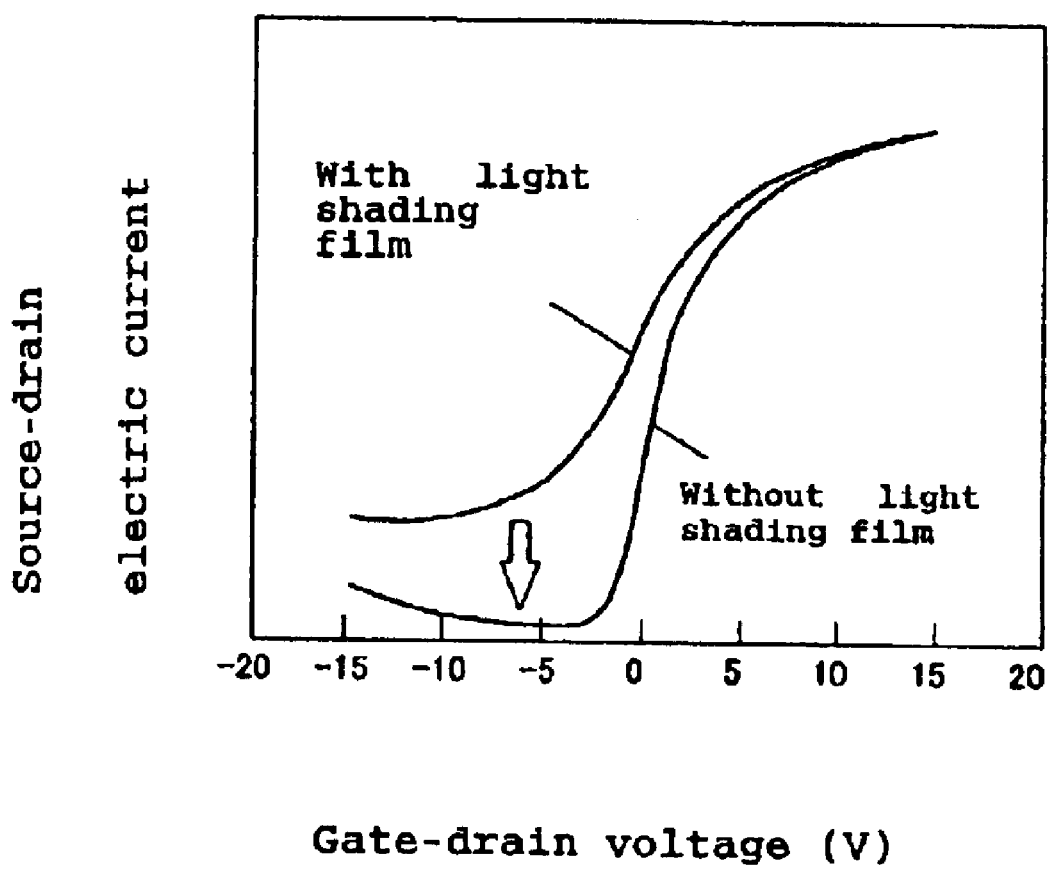
FIG. 5 shows test results in connection with the fourth embodiment of the invention.

FIG. 5 is a graph showing the relationship between the gate-drain voltage and the source-drain current both with and without the light shading film. As shown in the figure, when the light shading film 15a is not provided, even when the gate-drain voltage is 0 or lower, i.e., when the TFT is in an off-status, current flows between the source and the drain. As a result, the pixel potential fluctuates, leading to drawbacks such as deterioration of image quality caused by crosstalk, etc.

Alternatively, when the light shading film 15a is provided, when the gate-drain voltage is 0 or lower, i.e., when the TFT is in an off-status, little current flows between the source and the drain. Therefore, the above drawbacks can be eliminated, improving the image quality.

Figure 6:
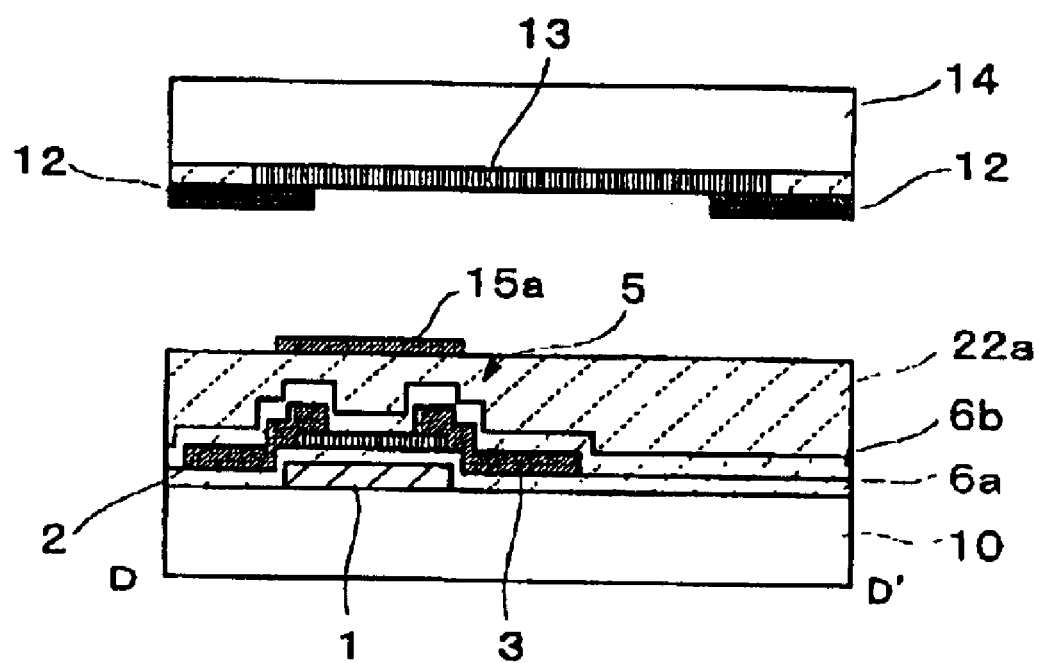
FIG. 6 is a cross-sectional view of a modified form of the fourth embodiment of the invention.

As shown in FIG. 6, it is possible to form the light shading film 15a and the storage capacity electrode 20a at the same time on a flat surface of a flattened film 22a made of silicon nitride (SiNx) or the like formed on the insulating layer 6b of the first embodiment by the CVD method, etc. When the flattened film 22a is formed as described above, the parasite capacitance inherently generated between the light shading film 15a and the TFT 5 can be reduced. This makes it possible to reduce the load on the TFT 5 and stabilize the operation on the TFT 5. Furthermore, the turbulence of the orientation of the sealed-in liquid crystal is minimized, obtaining a further improved display image quality.

(Fifth Embodiment)

Figure 7:
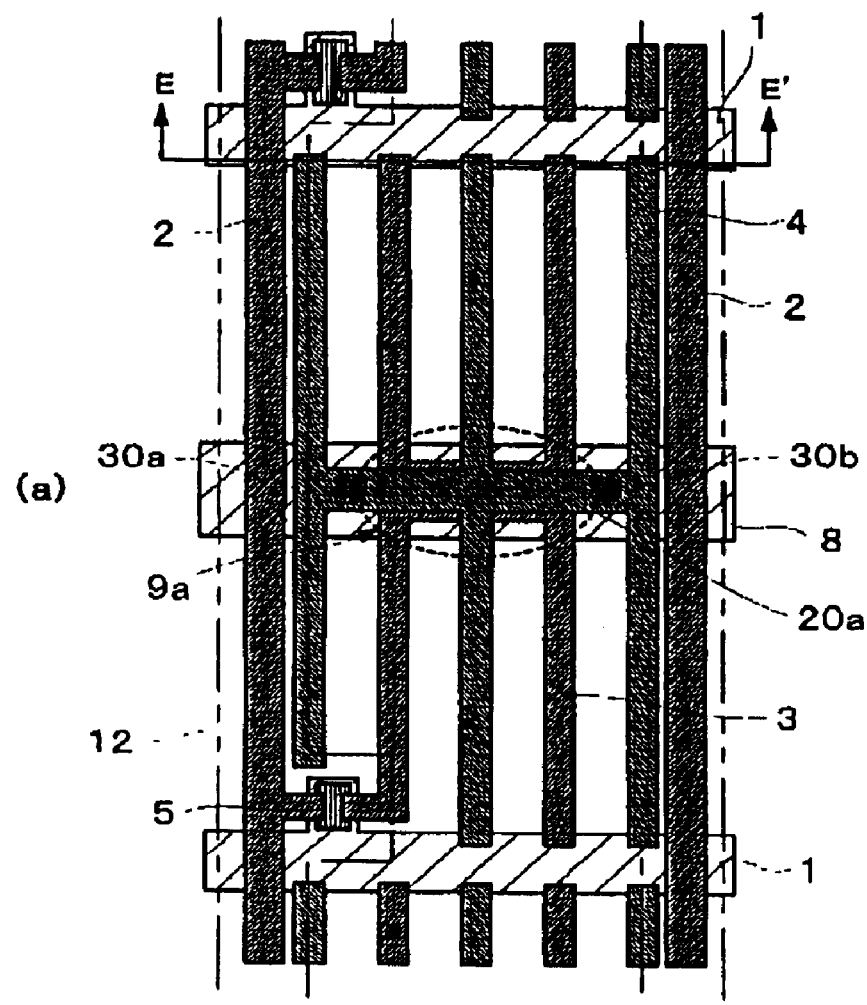
FIG. 7(*a*) is a plan view illustrating a structure of one pixel of an array substrate of a liquid crystal display according to a fifth embodiment of the invention, and FIG. 7(*b*) is a cross-sectional view taken along line E–E' of FIG. 7(*a*).
Figure 7:
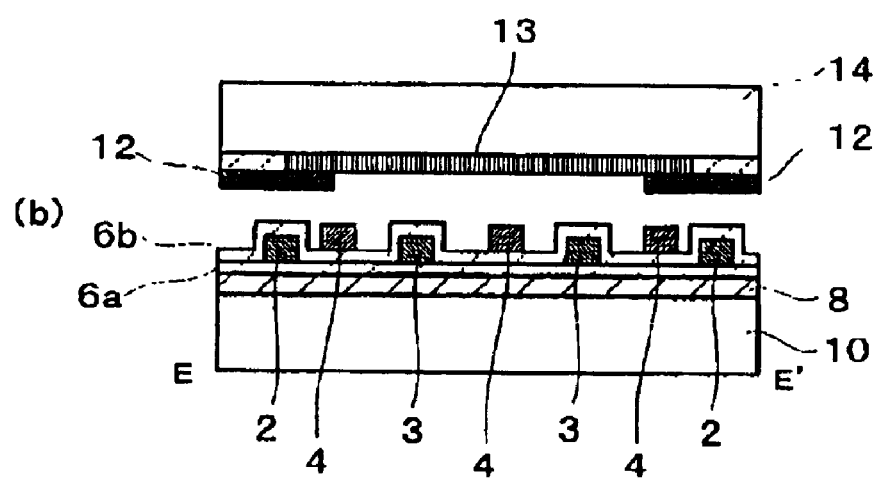

FIG. 7(a) is a plan view illustrating a structure of one pixel of an array substrate of a liquid crystal display according to a fifth embodiment of the invention, and FIG. 7(b) is a cross-sectional view taken along line E–E' of FIG. 7(a).

In the liquid crystal display device according to the first embodiment, the common electrode is formed on the same layer as the common wiring. The fifth embodiment is different from the first embodiment in that, the common electrode is formed on the same layer as a storage capacity electrode. In other respects, the construction of the fifth embodiment is the same as that of the first embodiment.

Precisely, a gate wiring 1 and a common wiring 8 are formed on an array substrate as a same layer. Upon the layer, a source wiring 2 and a pixel electrode 3 are formed as a same layer through an insulating layer 6a. On top thereof, a storage capacity electrode 20a and a common electrode 4 are formed through an insulating layer 6b. The common electrode 4 is electrically connected to the common wiring 8 via contact holes 30a and 30b formed in the storage capacity electrode 20a and the insulating layers.

As similar to the first embodiment, this structure allows the overlap area of the electrodes to become approximately half of the known storage capacity region 9, leading to an enhanced aperture ratio of pixel. Furthermore, the pixel electrode 3 and the common electrode 4 are formed on a separate layer from that of the gate wiring 1 with having the insulating layers 6a and 6b in between. This arrangement makes it possible to extend the ends of the pixel electrode 3 and the common electrode 4 to the gate wiring 1 without the risk of the pixel electrode 3 or the common electrode 4 causing a short-circuit with the gate wiring 1, and make the region where the drive of the liquid crystal is controllable wider in each pixel. Accordingly, this also enhances the aperture ratio.

When the ends of the pixel electrode 3 and the common electrode 4 overlap with the gate wiring 1, as indicated by the widths shown by the dash-dot-dot lines of FIG. 7(a), it is not necessary to form a black matrix along the gate wiring 1. In this case, it is preferable that the length where the ends of the pixel electrode 3 and the common electrode 4 overlap with the gate wiring 1 be 1 $\mu$m or greater with taking the alignment error into consideration. However, when the overlapping area becomes unduly large, parasitic capacitance becomes too large and this may cause rounding of signals of the gate wiring 1, and therefore it is preferable that the length be 5 $\mu$m or less.

(Sixth Embodiment)

Figure 8:
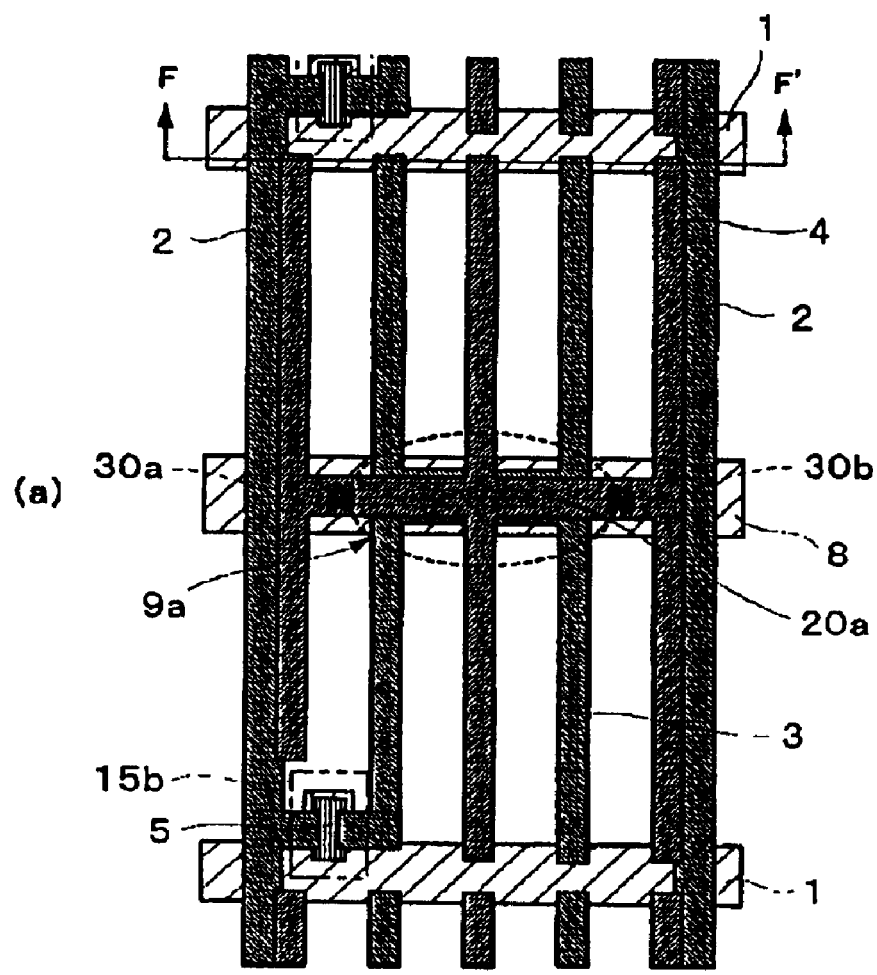
FIG. 8(*a*) is a plan view illustrating a structure of one pixel of an array substrate of a liquid crystal display according to a sixth embodiment of the invention, and FIG. 6(*b*) is a cross-sectional view taken along line F–F' of FIG. 8(*a*).
Figure 8:
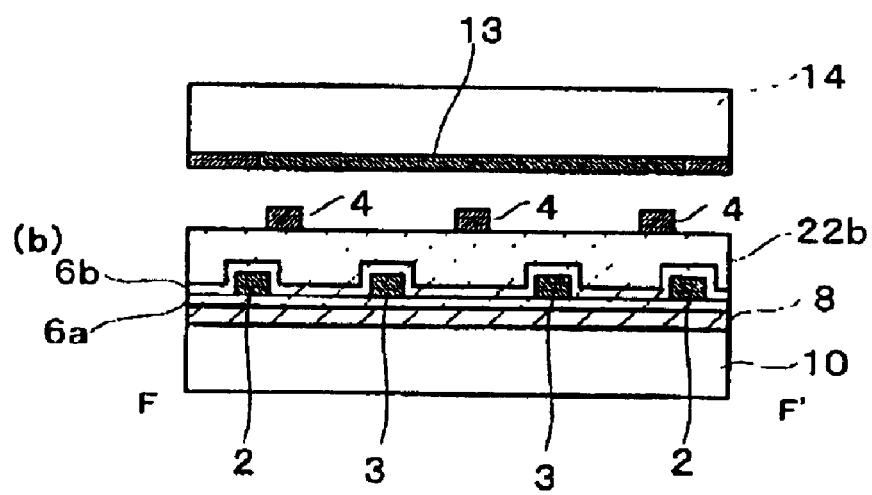

FIG. 8(a) is a plan view illustrating a structure of one pixel of an array substrate of a liquid crystal display device according to a sixth embodiment of the invention, and FIG. 6(b) is a cross-sectional view taken along line F–F' of FIG. 8(a).

In the liquid crystal display device of the fifth embodiment, the storage capacity electrode 20a and the common electrode 4 are formed on the insulating layer 6b; in the liquid crystal display device of the sixth embodiment, a storage capacity electrode 20a and a common electrode 4 are formed on an insulating layer 6b on a flattened film 22b. In other respects, the construction of the sixth embodiment is the same as that of the fifth embodiment.

According to this construction, the common electrode 4 can readily be arranged so as to overlap with a part of a source wiring 2 along the longitudinal direction thereof. Thereby, there is no leakage of light from a gap between the source wiring 2 and the electrode 4. Therefore, the region where drive of the liquid crystal is controllable is made further wider and the aperture ratio can be enhanced. In this case, it is not necessary to form a black matrix on an opposing substrate 14 on the area corresponding to this overlap.

As same as in the fourth embodiment, in the present embodiment, a light shading film can be formed on the same layer as the storage capacity electrode 20a and the common electrode 4 in the area as show by a dash-dot-dot line in FIG. 8(a). Employing this construction makes it possible not only to obtain a liquid crystal display device exhibiting a high level of image quality but also to simplify the manufacturing steps thereof by obviating the need to form a black matrix on the opposing substrate 14. As shown in FIG. 8(a), it is preferable that TFT 5 be formed on the gate wiring 1 for preventing leakage of light from around the TFT 5.

The flattened film 22b can be made of a silicon oxide film, a silicon nitride film or the like. However, it is preferable that the film be made of an organic film such as photosensitive acrylic resin for making the parasitic capacity generated in the area where the gate wiring 1 and the common electrode 4 overlap each other satisfactorily small. It is more preferable that the film thickness be 0.5 $\mu$m or greater. This diminishes problems such as crosstalk, etc. and further improves the display image quality. It is appropriate that the average thickness of the flattened film 22b be about 3 $\mu$m.

(Seventh Embodiment)

Figure 9:
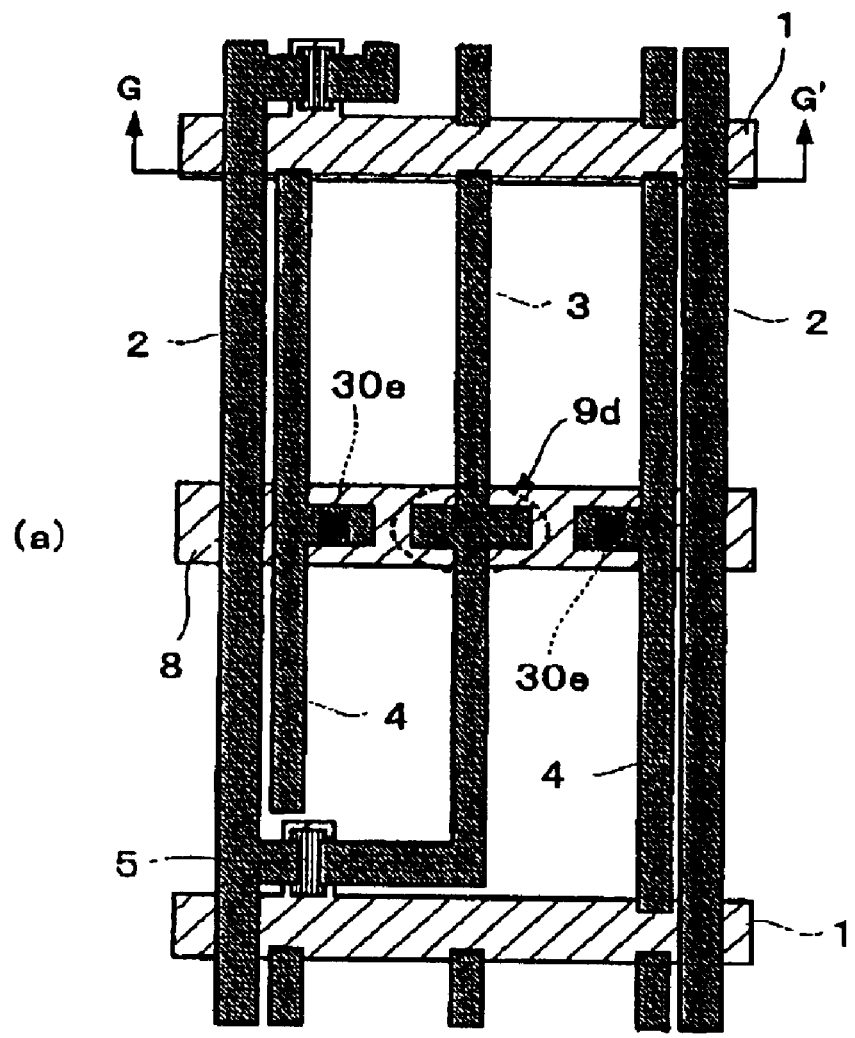
FIG. 9(*a*) is a plan view illustrating a structure of one pixel of an array substrate of a liquid crystal display according to a seventh embodiment of the invention, and FIG. 9(*b*) is a cross-sectional view taken along line G–G' of FIG. 9(*a*).
Figure 9:
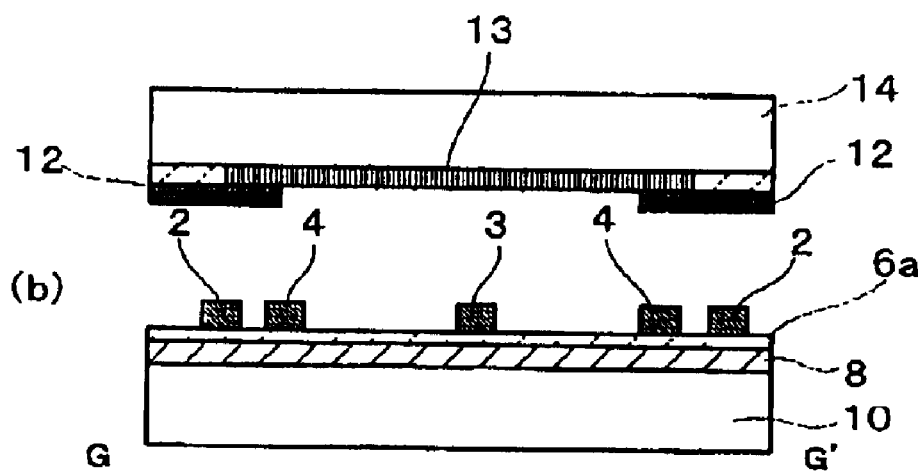

FIG. 9(a) is a plan view illustrating a structure of one pixel of an array substrate of a liquid crystal display device according to a seventh embodiment of the invention, and FIG. 9(b) is a cross-sectional view taken along line G–G' of FIG. 9(a).

Figure 11:
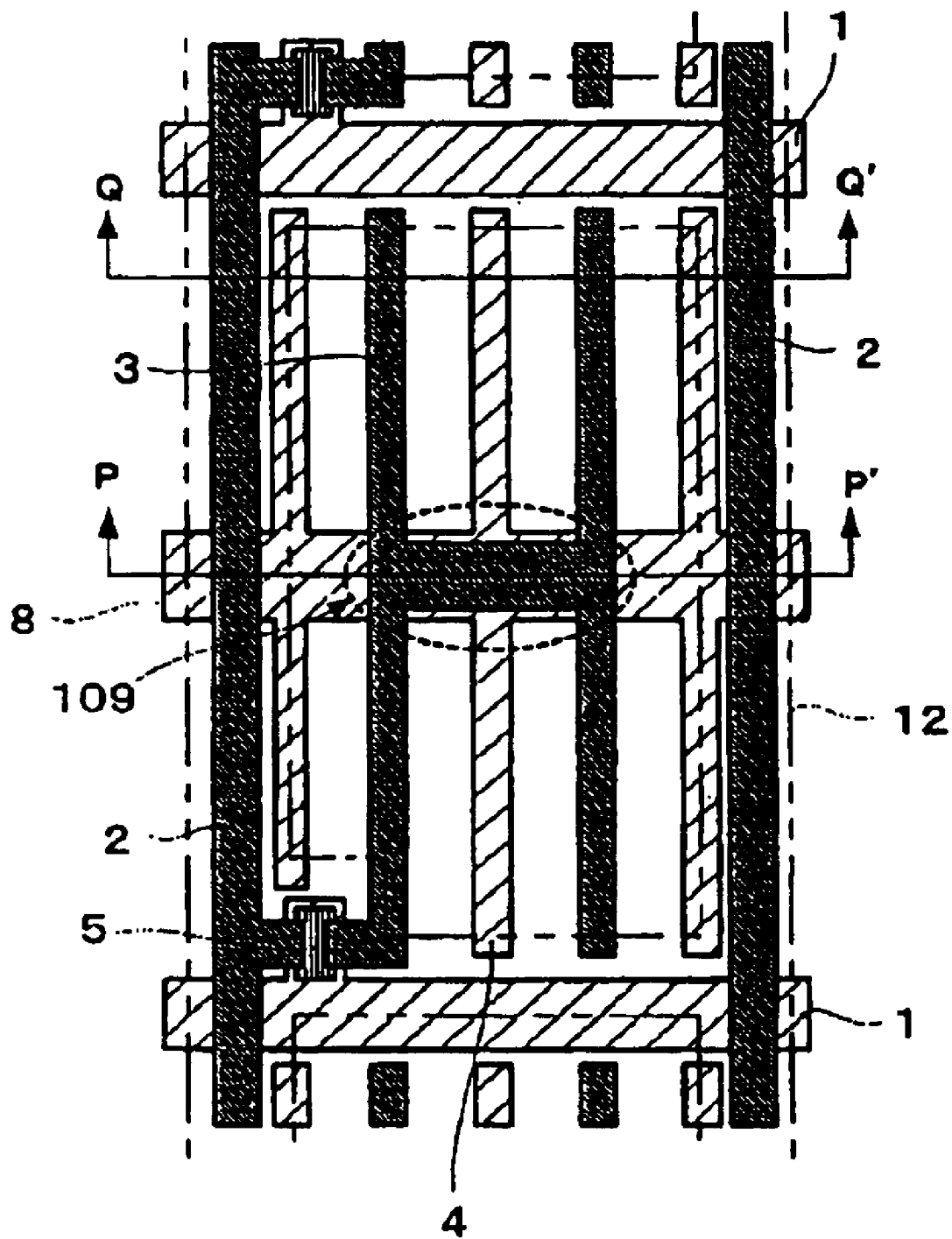
FIG. 11 is a plan view illustrating the structure of one pixel of an array substrate of a prior art liquid crystal display device.
Figure 12:
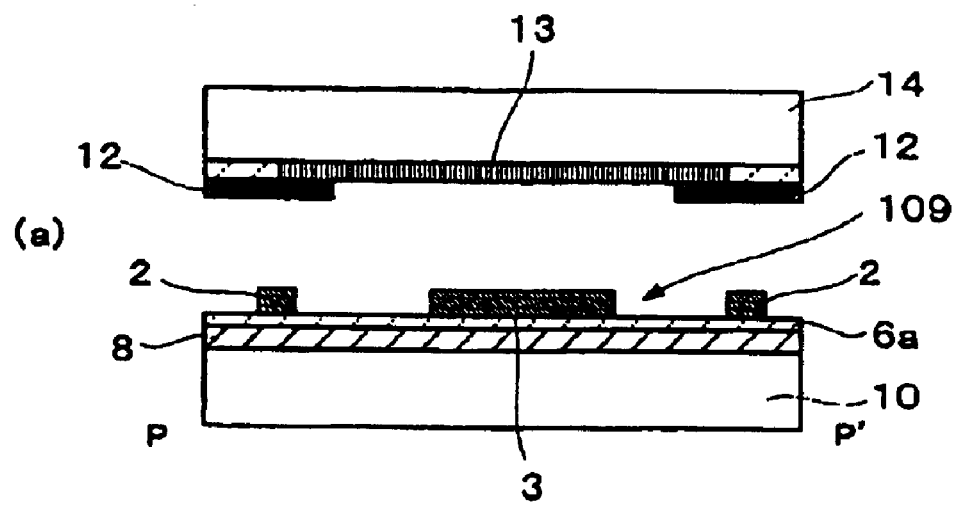
FIG. 12(*a*) is a cross-sectional view taken along line P–P' of FIG. 11.
Figure 12:
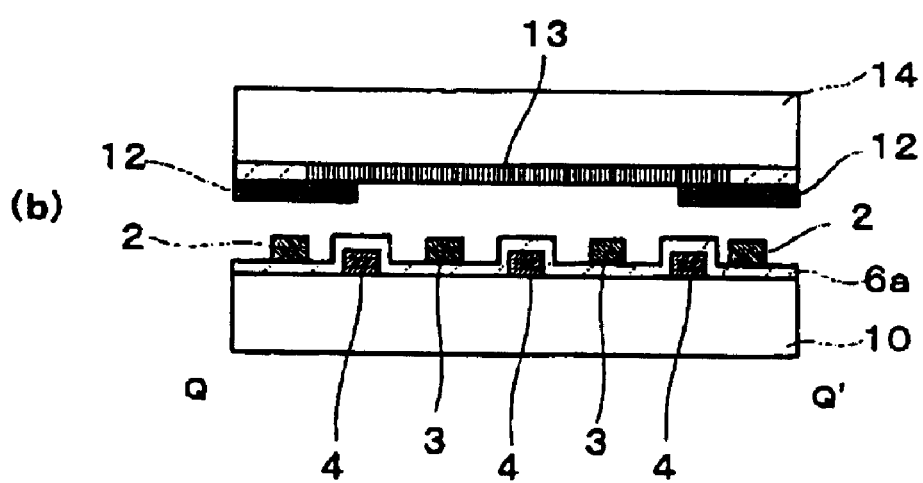

The liquid crystal display device of the seventh embodiment differs from the prior art liquid crystal display device shown in FIGS. 11 and 12 in that, in the prior art device, the common electrode 4 is formed on the same layer as the common wiring 8; however, in the liquid crystal display device of the seventh embodiment, a common electrode 4 is formed on a separate layer from that of the common wiring 8 and the same as that of a pixel electrode 3. In other respects, the construction of the liquid crystal display device of the present embodiment is the same as that of the known one.

Precisely, a gate wiring 1 and the common wiring 8 are formed on an array substrate 10 as a same layer. Upon thereof, through an insulating layer 6a, a source wiring 2, a pixel electrode 3 and the common electrode 4 are formed as a same layer. The common electrode 4 is electrically connected to the common wiring 8 formed in the insulating layer 6a via a contact hole 30e. A storage capacity region 9d is formed in the area where the pixel electrode 3 and the common wiring 8 overlap each other through the insulating layer 6a.

Similar to the fifth embodiment, this arrangement allows the ends of the pixel electrode 3 and the common electrode 4 to overlap with the gate wiring 1 and widens the region where drive of liquid crystal is controllable. On an opposing substrate 14, formation of a black matrix becomes unnecessary on the area corresponding to this overlap, enhancing the aperture ratio. As the same reason described in the fifth embodiment, it is preferable that the length of the area where the ends of the pixel electrode 3 and the electrode 4 overlap with the gate wiring 1 be from 1 $\mu$m to 5 $\mu$m.

(Eighth Embodiment)

Figure 10:
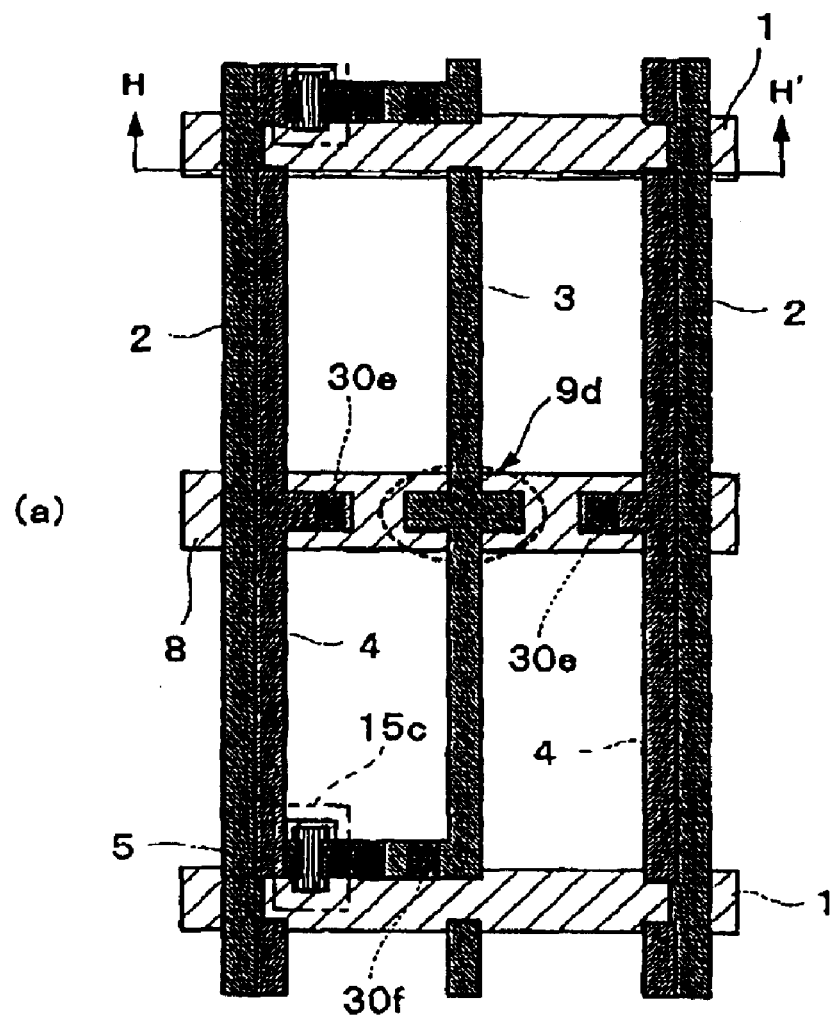
FIG. 10(*a*) is a plan view illustrating a structure of one pixel of an array substrate of a liquid crystal display according to an eighth embodiment of the invention, and FIG. 10(*b*) is a cross-sectional view taken along line H–H' of FIG. 10(*a*).
Figure 10:
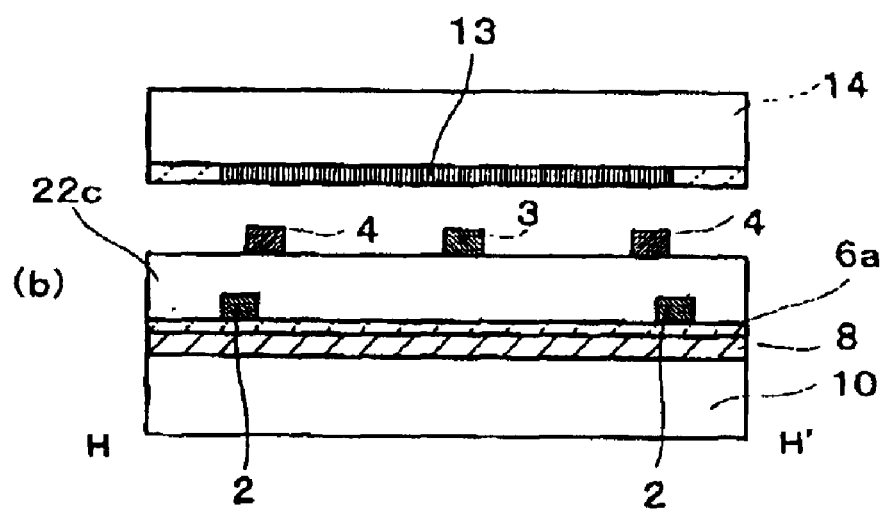

FIG. 10(a) is a plan view illustrating a structure of one pixel of an array substrate of a liquid crystal display device according to an eighth embodiment of the invention, and FIG. 10(b) is a cross-sectional view taken along line H–H' of FIG. 10(a).

The liquid crystal display device of the seventh embodiment and the eighth embodiment are different in that, in the seventh embodiment, the pixel electrode 3 and the common electrode 4 are formed on the same layer as the source wiring 2, and, in the eighth embodiment, a pixel electrode 3 and a common electrode 4 are formed on a separate layer from a source wiring 2 through a flattened film 22c. In other respects, the construction of the eighth embodiment is the same as that of the seventh embodiment.

Precisely, a source wiring 2 is formed on a gate wiring 1 and the common wiring 8 formed on an array substrate 10 through an insulating layer 6a. Upon thereof, the pixel electrode 3 and the common electrode 4 are formed as a same layer through the flattened film 22c. The drain end of a TFT 5 is connected to the pixel electrode 3 via a contact hole 30f.

According to this arrangement, it is possible to overlap at least some part of the common electrode 4 with the source wiring 2 along the longitudinal direction thereof, and therefore there is no risk of light leakage from a gap between the source wiring 2 and the common electrode 4. Accordingly, formation of a black matrix on an opposing substrate 14 becomes unnecessary on the area corresponding to this overlap, further enhancing the aperture ratio.

Similar to the fourth embodiment, as shown in a dash-dot-dot line in FIG. 10(a), a light shading film 15c can be formed on the same layer as the pixel electrode 3 and the common electrode 4. Employing this arrangement makes it possible not only to obtain a liquid crystal display device exhibiting a high level of image quality but also to reduce the manufacturing processes because formation of the black matrix on the opposing substrate 14 becomes unnecessary.

The pixel electrode 3 and the common electrode 4 can be formed as separate layers having an insulating layer in between. This reliably prevents short-circuit between the pixel electrode 3 and the common electrode 4.

(Other Embodiments)

Above, each embodiment of the invention is explained in detail. The precise embodiments of the invention, however, are not limited to these embodiments. For example, in the embodiments described above, the common electrode and the pixel electrode are metal electrodes; however, they can be formed as transparent electrodes made of ITO (Indium-Tin-Oxide), etc. This arrangement can further enhance the aperture ratio.

In each embodiment described above, when seen from a planar view, it is preferable that the storage capacity region is shaped so as to become smaller from one end, where the signal from the gate wiring is fed in, to the other end. This allows keeping a voltage applied to the liquid crystal to be substantially constant in each pixel without changing the main wiring and the shape of the electrode. Accordingly, generation of flicker can be prevented while eliminating drawbacks such as the breaking of wires, etc. Thus, the display image quality can be improved.

Furthermore, each pixel region defined by a plurality of gate wirings and a plurality of source wirings arranged in a matrix is not limited to a rectangular shape and may be a rhomboid-like shape.

What is claimed is:

1. A liquid crystal display device comprising:

an array substrate;

an opposing substrate facing the array substrate; and liquid crystal held between the array substrate and the opposing substrate, wherein the array substrate is provided with:
- a plurality of gate wirings and a plurality of source wirings intersecting each other;
- a pixel electrode disposed in a region defined by two adjacent gate wirings and two adjacent source wirings;
- a switching element for switching a voltage applied to the pixel electrode from the source wiring based on a signal voltage fed from the gate wiring;
- a common wiring formed between the two adjacent gate wirings;
- a common electrode being electrically connected to the common wiring and generating an electric field between the common electrode and the pixel electrode creating a voltage for driving the liquid crystal; and
- a storage capacity electrode electrically connected to the pixel electrode, wherein the pixel electrode and the storage capacity electrode are layered so as to hold at least some part of the common wiring in between through an insulating layer.

2. The liquid crystal display device according to claim 1 further comprising:

an additional storage capacity electrode electrically connected to the common wiring, wherein the common wiring and the additional storage capacity electrode are layered so as to hold at least some part of the pixel electrode or the storage capacity electrode in between through the insulating layer.

3. A liquid crystal display device comprising:

an array substrate;

an opposing substrate facing the array substrate; and liquid crystal held between the array substrate and the opposing substrate, wherein the array substrate is provided with:
- a plurality of gate wirings and a plurality of source wirings intersecting each other;
- a pixel electrode disposed in a region defined by two adjacent gate wirings and two adjacent source wirings;
- a switching element for switching a voltage applied to the pixel electrode from the source wiring based on a signal voltage fed from the gate wiring;
- a common wiring formed between the two adjacent gate wirings;
- a common electrode being electrically connected to the common wiring and generating an electric field between the common electrode and the pixel electrode creating a voltage for driving the liquid crystal; and
- a storage capacity electrode electrically connected to the common wiring, wherein the common wiring and the storage capacity electrode are layered so as to hold at least some part of the pixel electrode in between through an insulating layer, the liquid crystal display device further comprising:
an additional storage capacity electrode electrically connected to the pixel electrode, wherein the pixel electrode and the additional storage capacity electrode are layered so as to hold at least some part of the common wiring or the storage capacity electrode in between through the insulating layer.

4. The liquid crystal display device according to any one of claims 3 and 1, wherein the pixel electrode and/or the common electrode are made of a transparent electrode material.

5. The liquid crystal display device according to any one of claims 3 and 1, wherein the storage capacity electrode is shaped so as to become smaller from one end, where the signal from the gate wiring is fed in, to the other end.

* * * * *

UNITED STATES PATENT AND TRADEMARK OFFICE
CERTIFICATE OF CORRECTION

PATENT NO.   : 6,850,303 B2
DATED        : February 1, 2005
INVENTOR(S)  : Masanori Kimura et al.

It is certified that error appears in the above-identified patent and that said Letters Patent is hereby corrected as shown below:

Title page,
Item [74], Inventors, change "Daito" to -- Osaka --, the second and third inventors, change "Neyagawa" to -- Osaka --, the fifth inventor, change "Kanazawa" to
-- Ishikawa --
Item [30], should read as follows:
--[30] Foreign Application Priority Data
Sep. 27, 2000  (JP)……………..2000-293809 --

Signed and Sealed this

Seventeenth Day of May, 2005

JON W. DUDAS
*Director of the United States Patent and Trademark Office*